June 5, 1956     DE WOLF SCHATZEL     2,748,610
SPEED-DOUBLING POWER TRANSMITTING DEVICES Filed Jan. 26, 1953     2 Sheets-Sheet 1

INVENTOR
DeWolf Schatzel

INVENTOR
DeWolf Schatzel

United States Patent Office 2,748,610
Patented June 5, 1956

2,748,610

SPEED-DOUBLING POWER TRANSMITTING DEVICES

De Wolf Schatzel, North Baltimore, Ohio

Application January 26, 1953, Serial No. 333,217

2 Claims. (Cl. 74—69)

My invention relates to improvements in speed-doubling power transmitting devices, and as its principal object aims to provide an improved construction capable of transmitting larger torques than conventional constructions of equivalent size.

A further object of my invention is to provide an improved construction which embodies a minimum number of parts of a form adapted to be readily constructed and assembled and which is capable of rendering prolonged efficient and reliable service without requiring adjustment or repair.

The preferred form of my invention is illustrated in the accompanying drawings wherein.

Figure 1:
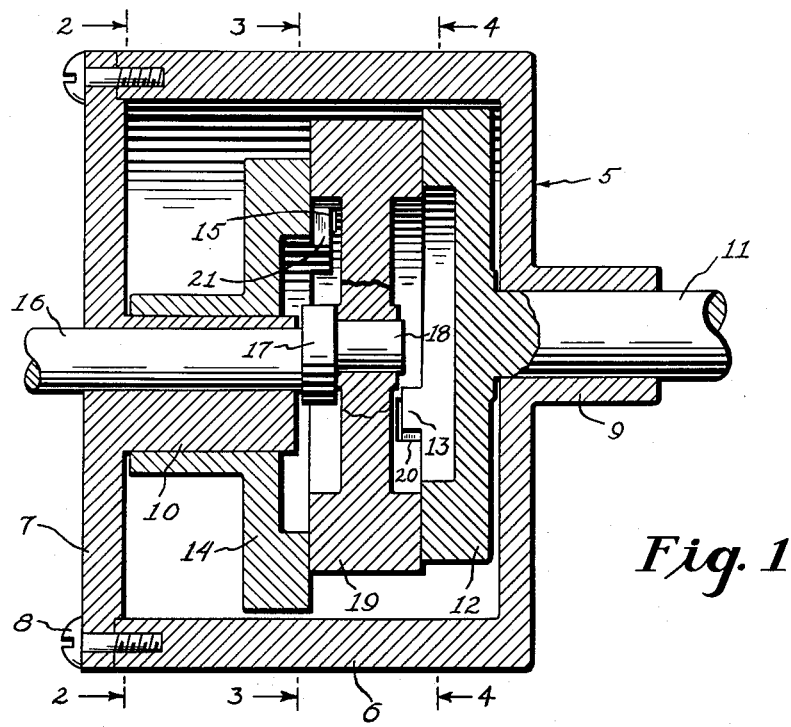
Figure 1 is a central longitudinal sectional view of a power transmitting device embodying my invention, with portions of the structure shown broken away for clearer illustration of certain details.
Figure 2:
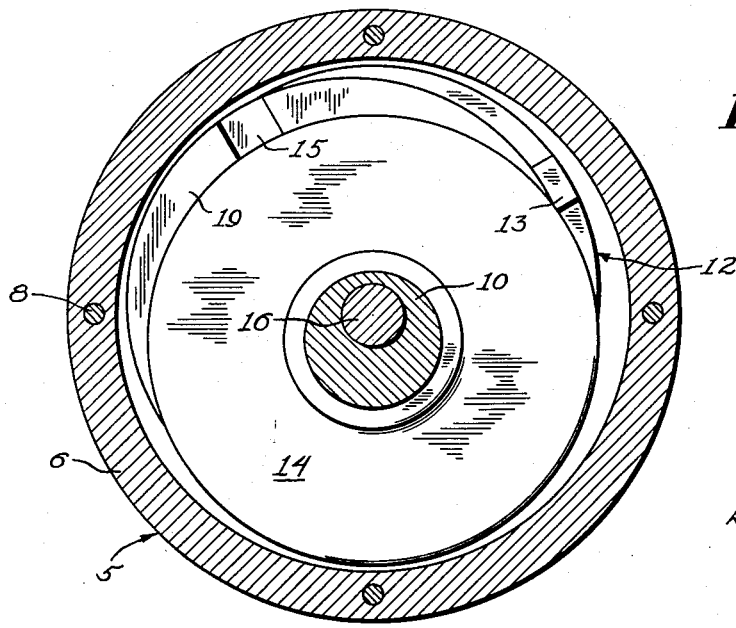
Figure 2 is a transverse sectional view taken in the direction of the arrows along the line 2—2 of Figure 1.
Figure 3:
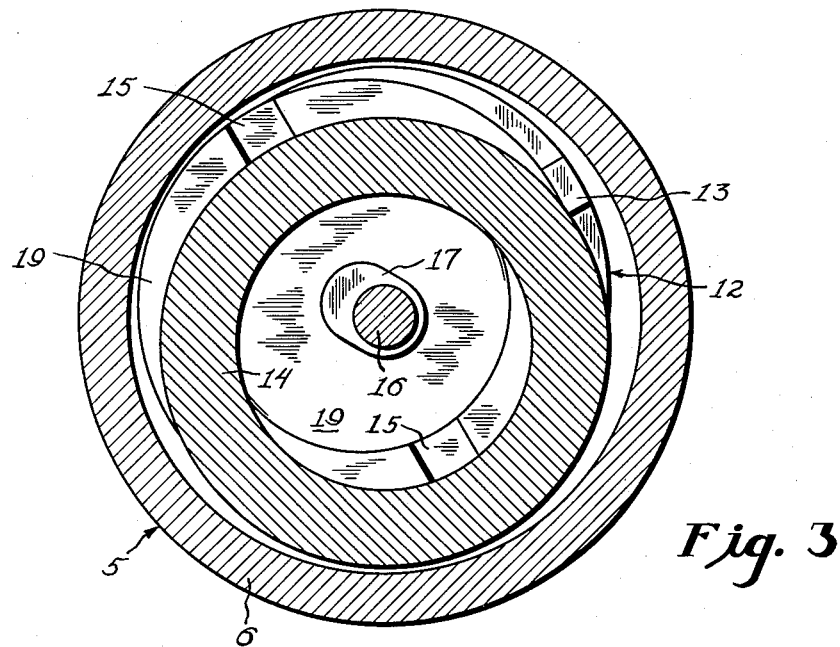
Figure 3 is a transverse sectional view taken in the direction of the arrows along the line 3—3 of Figure 1.
Figure 4:
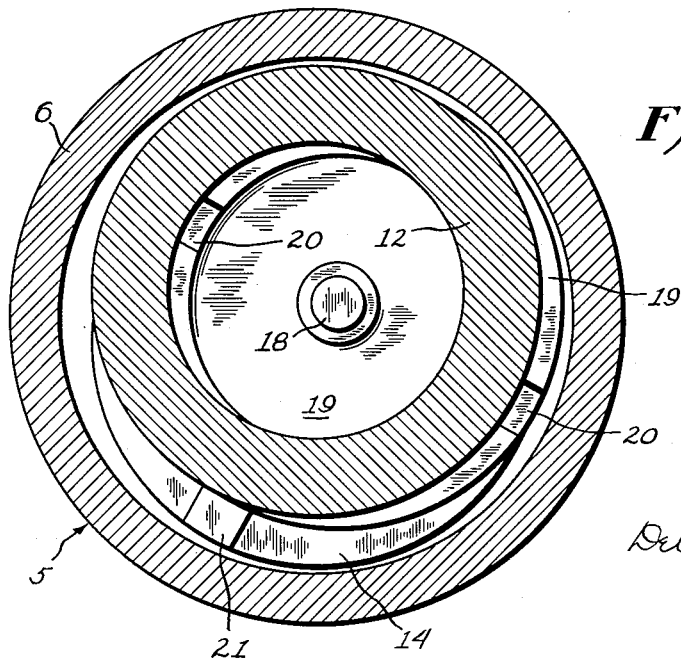
Figure 4 is a transverse sectional view taken in the direction of the arrows along the line 4—4 of Figure 1.

A housing, designated generally by the reference numeral 5, consists of a cylindrical barrel 6, closed at one end, and an end plate 7, secured to barrel 6 by means of screws 8. The closed end of barrel 6 is provided with an integral outwardly extending hub 9. End plate 7 is provided with an integral inwardly extending hub 10.

A driving shaft 11 is journaled in hub 9 and carries on its inner end an integral driving rotor 12. The interior face of driving rotor 12 is provided with two integral, radially extending, diametrically opposed guide ribs 13.

An auxiliary rotor 14 is journaled on hub 10. The axis of auxiliary rotor 14 is parallel to but displaced or offset from the axis of driving rotor 12. The interior face of auxiliary rotor 14 is provided with two integral, radially extending, diametrically opposed guide ribs 21.

A driven shaft 16 is journaled in hub 10 and is provided on its inner end with an integral crank web 17 and an integral crank pin 18. The axis of driven shaft 16 is parallel to, in the same plane as, and midway between the axes of driving rotor 12 and auxiliary rotor 14. The axis of crank pin 18 is parallel to the axis of driven shaft 16 but displaced or offset therefrom by a distance equal to one-half the distance between the axes of driving rotor 12 and auxiliary rotor 14.

A coupling rotor 19 is situated between the interior faces of driving rotor 12 and auxiliary rotor 14, and is journaled on crank pin 18. The face of coupling rotor 19 adjacent to driving rotor 12 is provided with two radially extending, diametrically opposed guide grooves 20 which slidably engage ribs 13 on the face of driving rotor 12. Similarly, the face of coupling rotor 19 adjacent to auxiliary rotor 14 is provided with two radially extending, diametrically opposed guide grooves 15 which slidably engage ribs 21 on the face of auxiliary rotor 14. Grooves 15 are located in quadrature with respect to grooves 20, as viewed in an axial direction.

From the foregoing description of the various parts of the device, the operation thereof may be readily understood. Driving rotor 12, coupling rotor 19, and auxiliary rotor 14 will be recognized as comprising a well known power transmitting device, commonly referred to as an Oldham coupling, which is widely used to connect two shafts whose axes are parallel to but displaced or offset from each other. It will be seen that if driving shaft 11 and driving rotor 12 are caused to rotate at any desired angular velocity, by the application of suitable external means, coupling rotor 19 and auxiliary rotor 14 will be caused to rotate at said angular velocity about their respective axes in the manner characteristic of the Oldham coupling.

It is especially to be noted, from the geometry of the device, that in addition to the aforesaid rotation of coupling rotor 19 about its axis at said angular velocity, the axis of coupling rotor 19 will itself be caused to rotate at twice said angular velocity about an axis parallel to, in the same plane as, and midway between the axes of driving rotor 12 and auxiliary rotor 14, and further, that the radius of the circle described by a point on the axis of coupling rotor 19 will be equal to one-half the distance between the axes of driving rotor 12 and auxiliary rotor 14. The utilization of this rotary motion of the axis of coupling rotor 19 at twice the angular velocity of driving rotor 12 is the essence of my invention, and is accomplished by the journalling of coupling rotor 19 on crank pin 18, which, as previously specified, is suitably mounted and free to partake of such rotation. Accordingly, when driving shaft 11 is caused to rotate by the application of suitable external means, driven shaft 16 will be caused by the action of coupling rotor 19 on crank pin 18 to rotate at an angular velocity twice that of driving shaft 11.

Although I have titled my invention a speed-doubling power transmitting device, and have so described it, it is obvious that shaft 16 may be used as the driving shaft, and shaft 11 as the driven shaft, in which case shaft 11 will rotate at one-half the angular velocity of shaft 16 when shaft 16 is caused to rotate by suitable external means. My invention may thus serve equally well as a speed-halving power transmitting device.

Furthermore, although I have shown only the preferred form of my invention, it should be understood that various changes or modifications may be made within the scope of the appended claims without departing from the spirit and scope of the invention.

I claim:

1. A power transmitting device comprising a rotatably mounted driving shaft; a driving rotor rigidly mounted on said driving shaft; an auxiliary rotor rotatably mounted with its axis parallel to but displaced from the axis of said driving rotor; a driven shaft rotatably mounted with its axis parallel to, in the same plane as, and midway between the axes of said driving rotor and said auxiliary rotor; a crank pin rigidly mounted on said driven shaft with its axis parallel to the axis of said driven shaft but displaced therefrom by a distance equal to one-half the distance between the axes of said driving rotor and said auxiliary rotor; a coupling rotor situated between said driving rotor and said auxiliary rotor and journaled on said crank pin; a first pair of integral, radially extending, diametrically opposed guide ribs projecting from the face of said driving rotor adjacent to said coupling rotor; a second pair of integral, radially extending, diametrically opposed guide ribs projecting from the face of said auxiliary rotor adjacent to said coupling rotor; a first pair of radially extending, diametrically opposed guide grooves situated in the face of said coupling rotor adjacent to said driving rotor and slidably engaging said first pair of guide ribs; and a second pair of radially extending, diametrically opposed guide grooves situated in the face of said coupling rotor adjacent to said auxiliary rotor and slidably engaging said second pair of guide ribs, said second pair of guide grooves being located in quadrature with respect to said first pair of guide grooves; said rotors thereby cooperating to impart to said driven shaft an angular velocity twice that of said driving shaft when said driving shaft is caused to rotate by external means.

2. A power transmitting device including a driving rotor; an auxiliary rotor having its axis parallel to the axis of said driving rotor; a coupling rotor having its axis parallel to the axes of said driving rotor and said auxiliary rotor; means of engagement between said coupling rotor and said driving rotor allowing only radial movement between said coupling rotor and said driving rotor; means of engagement between said coupling rotor and said auxiliary rotor allowing only radial movement between said coupling rotor and said auxiliary rotor, said latter radial movement being perpendicular to said former radial movement; a driven shaft having its axis parallel to and midway between the axes of said driving rotor and said auxiliary rotor; and eccentric means of engagement between said driven shaft and said coupling rotor.

References Cited in the file of this patent

UNITED STATES PATENTS

| | | |
|---|---|---|
| 2,284,675 | Nalbach | June 2, 1942 |
| 2,286,694 | Talbot | June 16, 1942 |
| 2,302,064 | Sieg | Nov. 17, 1942 |

FOREIGN PATENTS

| | | |
|---|---|---|
| 106,652 | Austria | May 23, 1925 |
| 590,313 | France | Mar. 11, 1925 |